United States Patent [19]

Tsuji et al.

[11] 4,324,177
[45] Apr. 13, 1982

[54] CALENDER ROLL FOR SUPERCALENDER

[75] Inventors: Nobuo Tsuji; Masaaki Fujiyama; Hiromi Nakahara; Eiichi Tadokoro; Keiji Tanaka; Isao Yamamoto, all of Odawara, Japan

[73] Assignee: Fuji Photo Film Co., Ltd., Minami-ashigara, Japan

[21] Appl. No.: 138,076

[22] Filed: Apr. 7, 1980

[30] Foreign Application Priority Data

Apr. 9, 1979 [JP] Japan .................................. 54-42855

[51] Int. Cl.³ .............................................. B30B 3/04
[52] U.S. Cl. .............................. 100/155 R; 100/176; 29/132; 427/130
[58] Field of Search ........... 100/155, 176, 161, 162 R; 29/132; 427/130

[56] References Cited

U.S. PATENT DOCUMENTS

| | | | |
|---|---|---|---|
| 3,686,731 | 8/1972 | Koori et al. | 29/132 |
| 3,707,752 | 1/1973 | Brafford et al. | 29/132 |
| 4,100,326 | 7/1978 | Somezawa et al. | 427/130 |
| 4,128,673 | 12/1978 | Watanabe et al. | 427/130 |
| 4,242,783 | 1/1981 | Watanabe et al. | 29/132 |

FOREIGN PATENT DOCUMENTS 1011114  11/1965  United Kingdom .................. 29/132

Primary Examiner—Peter Feldman
Attorney, Agent, or Firm—Fleit & Jacobson

[57] ABSTRACT

In a supercalender consisting of a metal roll and an elastic roll and smoothing a web by nipping the web between the metal roll and the elastic roll, the elastic roll satisfies the condition of:

$$Hs(D) \geq -0.1T + 85$$

under the condition of 50 to 500 kg/cm of the linear pressure between the metal roll and the elastic roll, where Hs(D) is Shore hardness D-scale of the elastic roll and T is the working temperature (°C.) of the elastic roller that satisfies the condition of $60 \leq T \leq 120$.

8 Claims, 1 Drawing Figure

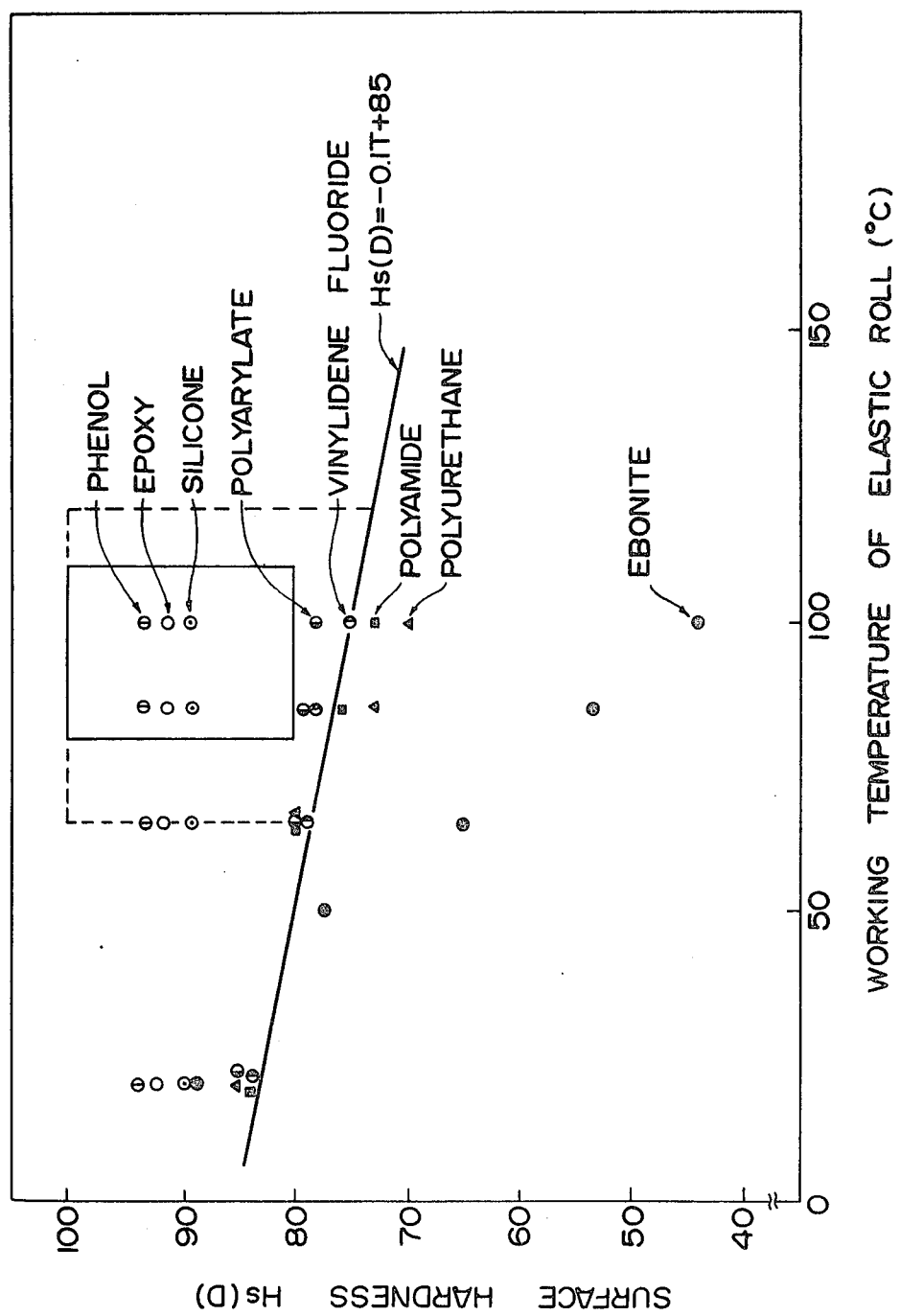

CALENDER ROLL FOR SUPERCALENDER

BACKGROUND OF THE INVENTION

1. Field of the Invention

This invention relates to a calender roll for a supercalender used for smoothing or glazing the surface of a web by nipping the web between a metal roll and an elastic roll, and more particularly to an improvement in an elastic roll for a supercalender used at a working temperature of 60° to 120° C.

2. Description of the Prior Art

The supercalender is a calender consisting of a metal roll and an elastic roll nipping a web with a comparatively high linear pressure of 50 to 500 kg/cm for smoothing or glazing the surface of the web. Particularly when glazing the surface of a web, the linear pressure is increased up to 100 to 500 kg/cm and the working temperature is raised up to 60° to 120° C. Therefore, the elastic roll must have high pressure resistance and high heat resistance. In order to meet such requirements, there have been made various researches and investigations to improve the surface hardness or material of the elastic roll. Japanese Patent Laid Open No. 51(1976)-92606, Japanese Patent Laid Open No. 51(1976)-103404, and Japanese Patent Publication No. 52(1977)-17404 propose this kind of improvements.

The above proposed elastic rolls, however, merely suggest the surface hardness or material of the elastic rolls at the room temperature or non-working temperature. No proposal is made regarding the surface hardness of the elastic roll at the working temperature namely while the elastic roll is used for calendering a web. Particularly, the relationship between the surface hardness and the working temperature of the elastic roll it is not known at all.

For instance, in manufacturing a magnetic tape, it is known that it is very important to smooth the surface of the magnetic layer of the tape for enhancing the S/N ratio of the tape. In order to smooth the surface to a very high degree or to glaze the surface, it is required to raise both the linear pressure at the nip of the rolls and the temperature of the rolls. In Japanese Patent Publication No. 52(1977)-17404 and Japanese Patent Laid Open No. 51(1976)-92606 it is proposed to make the surface hardness of the elastic roll 70° or more (Shore hardness D-scale), particularly 85° or more.

It is mentioned therein that the desirable hardness can be achieved by polyurethane or polyamide. It is true that the above mentioned hardness can be achieved by these materials at a room temperature. However, the desirable hardness cannot be obtained by these materials at a working temperature or a raised temperature. Particularly, when the working temperature becomes 80° C. or more, the desirable hardness of 85° (Shore hardness) cannot be obtained.

With the elastic roll as mentioned above the surface hardness of which falls below 85° at the working temperature it is impossible to perform the satisfactory smoothing and glazing of the tape. Further, it is considered impossible to perform the calendering for a long time at a high temperature. Therefore, the conventional supercalender is provided with a cooling means for cooling the elastic roll from inside or outside or cooling the web in order to prevent the elastic roll from being heated too much and enable the elastic roll to endure a long-term continuous working. However, while the supercalender is running for a long time, the surface temperature of the elastic roll gradually increases. Further, if the cooling efficiency of the elastic roll is made too high, the surface temperature of the magnetic tape or the like to be calendered is not raised sufficiently. Therefore, it is necessary to provide a heat-resistant elastic roll having a high surface hardness which has high resistant to a high temperature.

SUMMARY OF THE INVENTION

The primary object of the present invention is, therefore, to provide an elastic roll for a supercalender which has high resistant to high temperature.

A more specific object of the present invention is to provide an elastic roll for a supercalender which is capable of maintaining its high performance in smoothing and glazing a web even at a high temperature during a long-term continuous working.

The inventors have found and confirmed that it is necessary for the elastic roll to have sufficient surface hardness even at a high working temperature in order that the smoothing and glazing be conducted with high performance, and further have discovered an important condition as follows:

$$Hs(D) \geq -0.1T + 85$$

where Hs(D) is the surface hardness of the elastic roll designated by Shore hardness D-scale when the linear pressure between the rolls is 50 to 500 kg/cm, and T is the working temperature of the elastic roll.

According to the results of test conducted by the inventors, the desirable hardness Hs(D) was 75° to 100° when the linear pressure was 200 to 350 kg/cm and $65 < T < 120$, and particularly was preferred to be 80° to 100° when the linear pressure was 200 to 500 kg/cm and $80 < T < 110$.

DETAILED DESCRIPTION OF THE INVENTION

As the material for the elastic roll satisfying the above mentioned condition can be used non-fibrous plastics such as thermoset resins or thermoplastic resins having glass transition point (Tg) of 120° or more. For instance, epoxy resin, silicone resin, polyarylate resin, vinylidene fluoride resin, polyphenylene sulfide resin, phenol resin, unsaturated polyester resin, polyacetal resin, polyimide resin and the like can be used.

As the epoxy resin, a phenoxy type having the following component as the principal component is used.

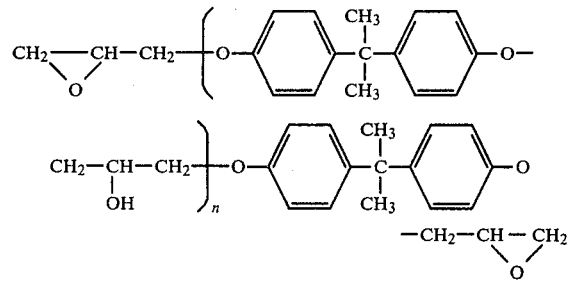

In this case, a hardening agent can be combined with the epoxy resin. As the hardening agent can be employed aliphatic multivalent amine (ethylenediamine, diethylenetriamine, diethylaminopropylamine, etc.), polyamide resin, aromatic polyamine, organic acid, organic acid anhydride, urea, melamine resin, aniline-formaldehyde resin, carbolic acid resin, and so forth. In case of epoxy resin, the resin is usually used in combination with a filler.

As a typical example of the epoxy resin, Epicoat 1001, 1009 and 828 of Shell Oil Company are known.

The silicone resin is represented by a general formula of

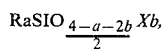

where R is a monovalent organic group. As the monovalent organic group R are known alkyl group like methyl group and ethyl group, alkynyl group like vinyl group and allyl group, aryl group like phenyl group and naphthyl group, alkyl aryl group like tolyl group, araalkynyl group like benzyl group, and halogenated alkyl group like trifluoropropyl group. In the above formula, the character a represents a positive number of 1.1 to 1.9. The character X represents a group like —OH, OR' (R' is a monovalent organic group like the above R), and Cl which forms a siloxane bond by reacting as a halogen. The character b represents a positive number satisfying $0 \leq b \leq 2.9$. The silicone resin is hardened by heating using a catalyst such as an organic acid salt of a transition metal like Mn, Zn, Fe, Co, Fi and Pb, amines like hexamethylenediamine and triethanolamine, quaternary ammonium and its organic acid salt like tetramethylammonium hydroxide and benzyltrimethylammonium hydroxide.

When the silicone resin is used for the elastic roll of this invention, it is combined with 10 to 400 parts of a filler. As the filler is used silica like quartz, calcium carbonate and carbon black having a mean grain size of 5 microns or less.

As the silicone resin are known silicone molding compounds of for instance DC-304, DC-305, DC-306 of Dow Corning Corporation and HMC-8,10,12 of Shinetsu Kagaku Kogyo K.K.

As the typical examples of the polyarylate resin are known aromatic polyester or polycarbonate having the principal component as shown below:

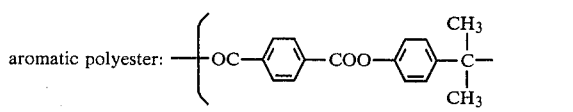

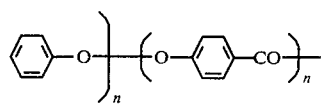

U-Polymer       Ekonol

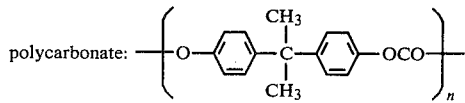

The former is represented by U-polymer (U-series, AX-series) of Unichika K.K. or Econol (101) of Carborundum Co., and the latter by Panlite series (Panlite K-1300 etc.) of Teijin Kasei K.K.

As the vinylidene fluoride resin are known KF polymer (#1000, #1100 series) of Kureha Kagaku Kogyo K.K., Kynar of Penwalt Chemicals Co., and Dulite of E.I. Du Pont de Nemours.

The polyphenylene sulfide resin is aromatic sulfide polymer having the principal component as shown below and is represented by Ryton AP-140 of Phillips Petroleum Company, ASAHI-PPS series of Asahi Glass K.K., and Shinetsu PPS series of Shinetsu Kagaku Kogyo K.K.

PPS resin: 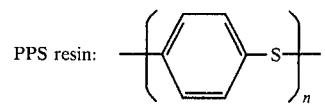

The phenol resin is a thermoset resin having the below described structure of condensation of phenol and formalin as the principal component, which resin is usually not used solely but used in combination with a various kind of filler. As the filler are used paper (bleached or unbleached), various fiber material (glass, carbon, cellulose etc.), wood flour, inorganic filler (carbon, quartz etc.) and textrues. The typical examples thereof are Sumicon PM-series and Sumilite resin PR-series of Sumitomo Bakelite K.K.

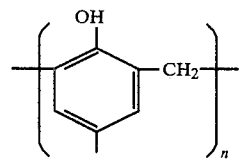

The unsaturated polyester resin is a polymer obtained by esterifying the combination of a maleic anhydride as shown below and a phthalic anhydride or other saturated polybasic acid by use of multivalent alcohol like ethylene glycol or propylene glycol, and adding a polymerizable monomer like a stylene monomer to the obtained unsaturated alkid.

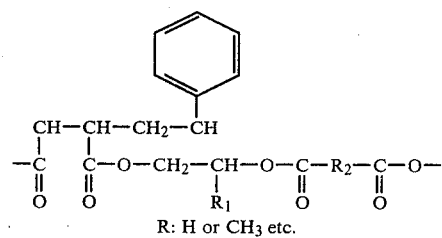

R: H or CH$_3$ etc.

R: 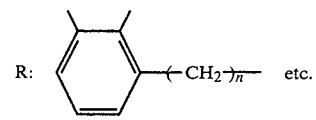 etc.

This unsaturated polyester resin is usually used in combination with a filler similarly to the phenol resin. The most typical resin is FRP. Sumicon TM-series is known as an example thereof.

As the polyacetal resin is known polyether resin having the principal component of

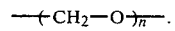

As examples thereof are known Delrin resin of E. I. Du Pont, Celcon of Celanese Co. and Duracon resin of Polyplastic Co.

As the polyimide resin are known XPI-182 of ACC Co., Vespel of E. I. Du Pont, HC resin and TI-polymer of Toray Co., Torlon resin of Amoco Co. and Polyimide 2080 of Upjohn Co. In any one of the above polyimide resins, aromatic polyimide resin is preferred.

It should be noted that the above examples are merely representative examples and any other non-fibrous plastic materials which can be formed into a calender roll can be used instead thereof if the above formula defining the relationship between the surface hardness Hs(D) and the working temperature T of the elastic roll is satisfied. Further, it will be noted that some of the above mentioned high molecular materials may be used together or may be mixed with other high molecular materials.

It is of course possible to add a proper filler to the above mentioned material to reinforce the material. As the filler can be used heat-resistant fibrous materials, solid powder and fine solid particles. As the fibrous material can be used rayon, glass fibers, carbon fibers or steel cord which has high heat-resistance and high durability.

As the solid powder and the fine particles can be used carbon black, $\alpha\text{-}Fe_2O_3$, $SiO_2$, colloidal silica, quartz powder, talc powder, tungsten disulfide, molybdenum disulfide, boron nitride, graphite, $Cr_2O_3$, and $TiO_2$. The particle size of the filler may be $10\mu$ or less and preferably not less than $5\mu$. The amount of the fibrous type or powder type of the added filler depends upon the use of the calender roll, but can be generally said preferred to be 1 to 20% of the resin to which it is added to effectively enhance the heat-resistance and hardness.

Thus, it is possible to obtain an elastic roll which has high durability and high heat-resistance and further high surface hardness at a high temperature.

The supercalender employing the elastic roll in accordance with the present invention can be used not only for smoothing or glazing the surface of a magnetic tape, but also for calendering paper in a paper manufacturing system.

Table 1 shows the relationship between the temperature and the surface hardness of the elastic roll for the resins some of which are proper for the elastic roll and some of which are improper therefor.

FIG. 1 shows the results of evaluation of the surface smoothness of the calendered magnetic tape processed through a supercalender which employs an elastic roll made of various materials. The results of evaluation are shown in the coordinate represented by the surface hardness Hs(D) and the working temperature T (°C.) of the elastic roll. In the coordinate, the region enclosed with a broken line above the line representing the formula of $Hs(D) = -0.1T + 85$ shows the conditions required for obtaining good results in calendering a magnetic tape. The region enclosed with a solid line square represents the conditions for obtaining further desirable results in which the surface smoothness is markedly improved as compared with the conventional calender and the S/N ratio is markedly improved.

Table 2 shows the characteristics of a video tape processed through the supercalender employing the elastic roll made of the various resin materials. As shown in Table 2, in case of polyurethane rubber, the roll was durable to the linear pressure of 300 Kg/cm at the working temperature of 65° C. However, when the working temperature was raised up to 85° C., the elastic roll was broken after the continuous running of two days. This was because the polyurethane rubber lost its surface hardness down to 73° at the surface temperature of 85° C. of the elastic roll and the roll was too much deformed during the calendering process which resulted in breaking due to internal heat build-up.

On the other hand, in case of the calender roll made of U-polymer, KF-polymer, epoxy resin or phenol resin, the durability of the roll was practically sufficiently high at the working temperature of 85° to 100° C. at the linear pressure of 280 to 300 kg/cm.

Therefore, with the elastic roll made of these materials it was possible to maintain the working temperature at 85° C. or more. Accordingly, reflecting this result the surface roughness of the magnetic tape was made 0.035 $\mu$m or less, particularly with phenol resin make down to 0.020 $\mu$m. Consequently, the sensitivity and S/N ratio were both markedly enhanced with respect to both a video signal and a color signal.

In Table 2.

\* The composition of the epoxy resin and the phenol resin was the same as that for the elastic roll shown in Table 1.
\*\* The surface roughness was measured by use of a contact feeler type surface roughness meter made by Tokyo Seimitsu K.K. The pick-up (ERM-D-100A) of the meter was put into contact with the surface of a processed magnetic tape, and the output signal of the pick-up was amplified by an amplifier (EMD-F10A) and recorded by a chart recorder (E-RC-CF). The values shown in the table is based on the maximum roughness (Hmax).

TABLE 1

| | Name of Resin for Elastic Roll | Mark in FIG. 1 | Surface Hardness Hs(D) | | | |
|---|---|---|---|---|---|---|
| | | | 20° C. | 65° C. | 85° C. | 100° C. |
| Proper Resins | epoxy resin (Shell Chemicals Epicoat 828 + quartz) | ⊖ | 92.0 | 91.5 | 91.0 | 90.5 |
| | silicone resin (Dow Corning Corp. DC-305) | ⊙ | 89.5 | 89.0 | 89.0 | 88.0 |
| | phenol resin (Sumitomo bakelite K.K. Sumicon + unbleached paper) | ① | 93.7 | 93.0 | 93.0 | 93.0 |
| | polyarylate resin (Unichika K.K. U-100) | ② | 83.7 | 80.0 | 79.0 | 78.0 |
| | vinylidene fluoride resin (Kureha Kagaku FK-polymer) | ③ | 82.3 | 79.0 | 78.0 | 75.0 |
| | polyphenylene sulfide resin (Phillips Liton AP-400) | □ | 87 | 85.0 | 83.0 | 82.0 |
| Improper Resins | polyurethane resin (containing carbon black) | △ | 85 | 80 | 73 | 70 |
| | polyamide resin (MC nylon + carbon black) | ▨ | 79 | 80 | 76 | 73 |
| | ebonite | ⊕ | 89 | 65 | 53 | 44 |

TABLE 2

| | Results of Test on Magnetic Tape | | | | | |
|---|---|---|---|---|---|---|
| Material for Elastic Roll | Polyurethane Rubber | | U-polymer | KF-polymer | Epoxy resin* | Phenol Resin* |
| Working Temperature (°C.) | 65 | 85 | 95 | 85 | 100 | 100 |
| Surface Hardness (Shore D) | 80 | 73 | 79 | 78 | 91 | 93 |

TABLE 2-continued

| | Results of Test on Magnetic Tape | | | | | |
|---|---|---|---|---|---|---|
| Material for Elastic Roll | Polyurethane Rubber | | U-polymer | KF-polymer | Epoxy resin* | Phenol Resin* |
| Working Temperature (°C.) | 65 | 85 | 95 | 85 | 100 | 100 |
| Linear Pressure (Kg/cm) | 300 | 300 | 300 | 300 | 300 | 280 |
| Durability of Roll | good | broken in 2 days | good | good | good | good |
| Sensitivity for video signal | 0 | +0.4 | +0.9 | 0.8 | +1.5 | +1.2 |
| S/N for video signal | 0 | +1.0 | +2.2 | +1.9 | +2.7 | +2.5 |
| Sensitivity for color signal | 0 | +0.2 | +0.5 | +0.5 | +0.9 | +0.7 |
| S/N for color signal | 0 | +1.5 | +2.8 | +2.2 | +3.6 | +3.1 |
| Surface Roughness μm** | 0.07 | 0.05 | 0.030 | 0.035 | 0.020 | 0.025 |

We claim:

1. In a supercalendar comprising a metal roll and an elastic roll for smoothing the surface of a web by nipping the web between the metal roll and the elastic roll, the improvement which comprises, said elastic roll formed from a material satisfying the conditions of $$Hs(D) \geqq -0.1\,T + 85$$

at a linear pressure between the rolls of 50 to 500 Kg/cm, where Hs(D) is Shore hardness D-scale of the surface of the elastic roll, and T is the working temperature (°C.) of the elastic roll varying within the range of $60 \leqq T \leqq 120$.

2. An elastic roll for a supercalender as defined in claim 1 wherein said conditions are $$75 \leqq Hs(D) \leqq 100$$

at the linear pressure of 200 to 350 Kg/cm and at the working temperature of $65 < T < 120$.

3. An elastic roll for a supercalender as defined in claim 1 wherein said conditions are $$80 \leqq Hs(D) \leqq 100$$

at the linear pressure of 200 to 500 Kg/cm and at the working temperature of $80 < T < 110$.

4. An elastic roll for a supercalender as defined in claim 1 wherein said elastic roll is made of a phenol resin.

5. An elastic roll for a supercalender as defined in claim 1 wherein said elastic roll is made of an epoxy resin.

6. An elastic roll for a supercalender as defined in claim 1 wherein said elastic roll is made of a silicone resin.

7. An elastic roll for a supercalender as defined in claim 1 wherein said elastic roll is made of a polyarylate.

8. An elastic roll for a supercalender as defined in claim 1 wherein said elastic roll is made of a polyvinylidene fluoride.